United States Patent [19]
Keady et al.

[11] 3,712,683
[45] Jan. 23, 1973

[54] BRAKE WARNING SWITCH

[75] Inventors: Frederick D. Keady, Cleveland Heights; Richard J. Silagy, Parma, both of Ohio

[73] Assignee: The Weatherhead Company, Cleveland, Ohio

[22] Filed: March 11, 1970

[21] Appl. No.: 18,636

[52] U.S. Cl............303/6 C, 60/54.5 E, 188/151 A, 188/349, 200/82 D, 303/84 A, 340/52 C
[51] Int. Cl..........B60t 17/22, B60t 8/26, B60t 11/34
[58] Field of Search....................303/84 R, 84 A, 6 C; 188/151 A, 345, 349; 200/82 D; 340/52 C; 60/54.5 E

[56] References Cited

UNITED STATES PATENTS

| | | | |
|---|---|---|---|
| 3,556,607 | 1/1971 | Shutt et al. | 303/84 A X |
| 3,448,230 | 6/1969 | Bueler | 303/84 A X |
| 3,508,793 | 4/1970 | Bueler | 303/6 C |
| 3,480,333 | 11/1969 | Stelzer | 303/84 A X |

Primary Examiner—Trygve M. Blix
Assistant Examiner—John J. McLaughlin
Attorney—McNenny, Farrington, Pearne and Gordon

[57] ABSTRACT

A fluid pressure switch unit is disclosed for use in a motor vehicle dual hydraulic brake system having a front brake circuit and a rear brake circuit. The rear brake circuit includes a pressure reducing valve for preventing premature lock-up of the rear wheel brakes. A fluid pressure failure in the front circuit operates the switch unit to actuate a warning signal, and the valving mechanism includes a bypass opening in an insert member disposed in one end of a bore in the switch unit housing. The bypass opening is normally closed by a valve member which is slidably carried by the switch piston. Movement of the switch piston to actuate the warning device moves the valve member away from the bypass opening to bypass the pressure reducing valve and supply full pressure to the rear brakes. When the switch piston is returned to a centered position, the bypass opening is again closed by the valve member to return the proportioning valve to the circuit.

10 Claims, 2 Drawing Figures

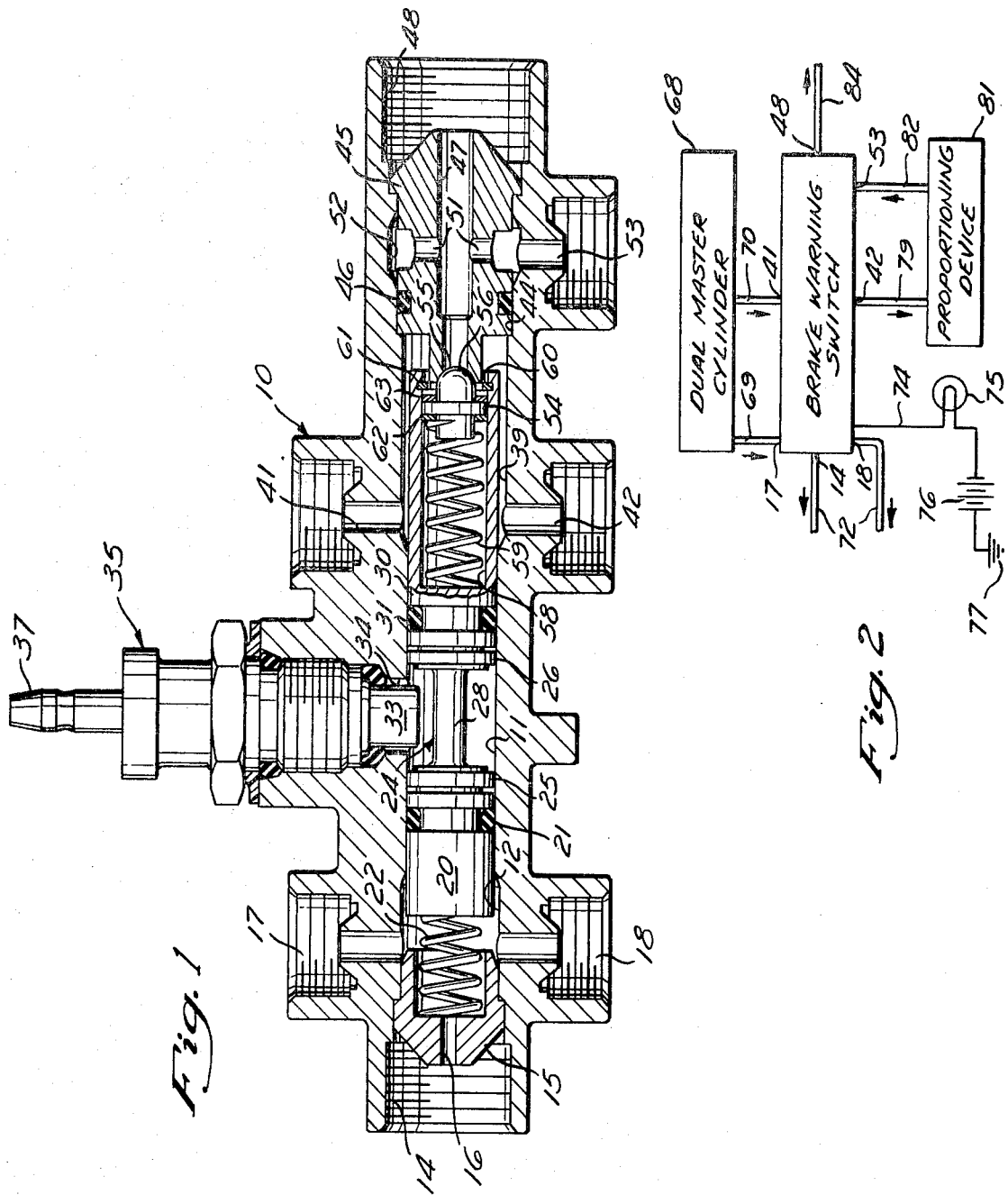

BRAKE WARNING SWITCH

BACKGROUND OF THE INVENTION

This invention relates generally to dual braking systems for motor vehicles and more particularly to sensing devices operable to detect a pressure unbalance between the two circuits of the dual system resulting from a failure in one circuit. Still more particularly, the invention relates to the incorporation of a valving mechanism in such devices which is operable to bypass a proportioning or pressure reducing valve in one of the brake circuits to allow full applied brake pressure to be transmitted directly to the brakes of the one circuit by bypassing the pressure reducing valve in the event of a fluid pressure failure in the other circuit and to retain the pressure reducing valve in the circuit when both brake circuits are again functioning in the normal manner.

Motor vehicle dual braking systems having hydraulically isolated front and rear brake circuits have received wide acceptance because the brakes of one circuit will remain operative even in the event of a fluid pressure failure in the other circuit. Because of the powerful braking characteristics of brakes used in modern motor vehicles, it has been recognized that a driver might not notice a failure in one circuit of the dual system by virtue of an increased requirement in applied pressure or stroke of travel of the brake pedal. For this reason various methods have been devised for providing a sensing device, usually in the form of an electrical switch, which is sensitive to a pressure differential between the fluid pressures of the two circuits to operate a warning light or other device to warn the vehicle operator that a failure in one of the circuits has taken place. The most common form of such a device is in the form of an electric switch utilizing a movable piston member exposed to the pressures in the two circuits so that the switch remains inoperative as long as the two circuits are in substantial fluid pressure balance. However, whenever a fluid pressure unbalance occurs between the two circuits, for example, as a result of a failure or leak in one of the circuits, the device responds by closing an electric circuit to operate a warning device such as a signal light on the dashboard.

In certain brake systems, proportioning or pressure reducing valves are used in one of the circuits to reduce the pressure from that supplied by the master cylinder to a lower pressure level which is supplied to the brake operating cylinders. However, the pressure reduction produced by such valves is undesirable whenever a failure in the other circuit occurs because it reduces the effectiveness of the remaining portion of the system. A common application of such a system is in hybrid braking systems using a disc brake arrangement on the front wheels and a self-energizing type drum brake on the rear wheels. Because of the different characteristics of the two brake units in such a hybrid system and because of the weight transfer from the rear wheels to the front wheels, premature lock-up of the rear wheels may occur during strong braking action unless a pressure reducing or proportioning valve is interposed between the master cylinder and the rear brake actuating cylinders to limit the pressure build-up in the brake actuating cylinders below that coming from the master cylinder whenever the pressure levels rise above a certain predetermined level. In these systems, the front and rear brakes receive substantially the same pressure directly from the dual master cylinder before the pressure reaches a predetermined level. However, when the master cylinder pressure increases above the predetermined pressure level, the rear wheel brakes receive a proportionally lower pressure because of the pressure reduction in the proportioning valve.

In such a system, if the front brakes fail, there will be an increased pressure requirement in the rear brakes to produce the necessary braking action with any given brake pedal force. Because of the presence of the proportioning valve in the rear circuit an even greater force is required at the brake pedal than would be necessary to actuate the rear brakes if they received full pressure. Therefore, it has been recognized as desirable in such cases that the proportioning valve in the rear brake system be bypassed or disconnected if the front brakes fail so that the rear brakes receive the full pressure from the master cylinder regardless of the pressure level in the system. The brake failure sensing device which detects the pressure loss in the front system and responds accordingly is particularly suitable to produce the valving action necessary to bypass the proportioning valve.

SUMMARY OF THE INVENTION

Briefly, the foregoing and other objects and advantages of the invention are achieved, according to the preferred embodiment of the invention, by providing a housing having an axial bore therein in which is mounted a sliding piston member. One end face of the piston member is exposed to the fluid pressure of one circuit of the dual braking system such as the circuit for the front brakes, while the other end face is exposed to the fluid pressure of the other circuit such as the circuit for the rear brakes. Under normal conditions, the fluid pressures in the front circuit and the rear circuit are substantially equal so that the piston member remains in a centered position. However, in the event of a fluid pressure failure in one of the circuits, the resulting pressure differential acting across the piston member will displace the piston member from its centered position to actuate a warning switch mechanism which actuates an audio or visual warning device to warn the vehicle operator of the failure.

The preferred embodiment of the invention further provides such a housing with a first inlet port for receiving fluid from one pressure chamber of a dual master cylinder, a first outlet port for supplying the fluid pressure from the master cylinder to a proportioning valve, a second inlet port for receiving fluid from the proportioning valve, and a second outlet port for supplying fluid from the proportioning valve to the rear wheel brakes. A valving mechanism is provided which effectively removes the proportioning valve from the rear circuit in the event of a fluid pressure failure in the front circuit to provide full fluid pressure to the rear brakes under such emergency conditions.

In the preferred embodiment, this is accomplished by providing an insert member which is anchored in the bore and which includes a bypass passage means operable to establish direct fluid communication between the first inlet port and the second outlet port when the bypass passage is opened. A valving member is carried by the switch piston member and closes the bypass passage when the piston member is in its centered position. However, in the event of a fluid pressure failure in the front circuit which would result in movement of the piston member to actuate the alarm device, the valving member is moved away from the bypass passage to open the bypass passage. This establishes direct fluid pressure communication between the first inlet port and the second outlet port to bypass the proportioning valve and supply full fluid pressure to the rear wheel brakes of the vehicle. The insert member is a fitting member which cooperates with the second outlet port to receive a suitable fitting for connection to the remainder of the brake system.

In the preferred embodiment, the valving member is slidably carried by the piston member and resiliently urged toward the bypass passage. In this manner, when the piston member is in its centered position, the resilient means insures that the valving member will engage the bypass passage with a sufficient force for sealing purposes. Additionally, the spring force of the resilient means can also be used to provide a centering action to maintain the piston member in its center position when the fluid pressures in the front and rear circuits are substantially equal. Additionally, this arrangement permits the valving member to act as a return flow check valve to re-establish fluid pressure communication between the master cylinder and the rear wheel brake cylinders after the brakes have been applied and the master cylinder pressure is subsequently reduced. In this manner, the resiliently mounted valving member obviates the requirement for such a return flow check valve in the proportioning valve. Still further, by resiliently mounting the valving member on the switch piston, the pressure differential between the master cylinder pressure and the rear wheel brake cylinder pressure operates to maintain the valving member against its associated valve seat while still permitting an arrangement in which the second outlet port may be arranged on the end of the housing in axially aligned relationship with the axial bore.

BRIEF DESCRIPTION OF THE DRAWINGS

The foregoing and additional objects and advantages of the invention are achieved in the preferred embodiment of the invention as set forth hereinafter in greater detail and shown in the accompanying drawings, in which;

FIG. 1 is a longitudinal cross-sectional view of the preferred embodiment of the invention; and FIG. 2 is a schematic diagram of a brake system incorporating the device of FIG. 1.

DESCRIPTION OF THE PREFERRED EMBODIMENT

Referring now to the drawings in greater detail, the device shown in FIG. 1 includes a housing 10 having an axial bore 11 extending lengthwise therethrough. At its left end, the axial bore 11 has an enlarged counterbore 12 terminating at its outer end in an internally threaded passage or port 14 adapted to receive a suitable hydraulic fitting. A fitting member 15 is mounted with a sealing fit within the counterbore 12 and includes an axial passage 16 opening into the interior of counterbore 12. Upper and lower radial passages or ports 17 and 18 are provided from the counterbore 12 which terminate at their outer ends in suitable fitting receiving portions in a manner well known in the art. It will be understood that while the passage 17 may be considered the inlet and the passages 14 and 18 may be considered as outlets to the two separate front brakes, since all of these passages open commonly into the counterbore 12 they are interchangeable in function and any one may be used as an inlet with one or more of the remaining passages used as an outlet.

In the left end of the axial bore 11 is located a left piston member 20 carrying an O-ring seal 21 adapted to make sealing contact with the bore. A helical compression spring 22 is mounted between the fitting 15 and the left piston 20 to produce a biasing force to the right on the left piston 20 for the reasons described in greater detail hereinafter. It will be understood that the construction described hereinabove is representative of typical devices and otherwise forms no portion of the present invention.

An intermediate member 24 is provided with left and right end portions 25 and 26 respectively of substantial bore diameter adapted to make contact with the bore with a sufficiently tight fit as to insure electrical contact between the intermediate member 24 and the housing 10. Between the ends 25 and 26 is provided a reduced diameter portion 28 of substantially less diameter than that of the axial bore 11. A right piston 30 is also slidably mounted in the bore 11 and is provided with an O-ring 31 to make sealing contact with the axial bore 11. An electrical contact stud 33 projects radially into the axial bore 11 through a transverse opening 34 and is carried in an insulated mounting by a suitably mounting assembly 35 mounted in housing 10 which includes a terminal 37 for contact to the external warning device. It will be understood that stud 33 and terminal 37 are electrically insulated from the mounting member 35 and the housing 10 so that upon movement of the intermediate member 24 in either direction, the contact of the one of the end portions 25 and 26 will result in electrical contact between the stud 33 and the housing 10 to complete an electrical circuit between the housing 10, which is normally grounded, and the external terminal 37. The foregoing structure is substantially the same as that shown in the U.S. Pat. to Paul J. Miller, No. 3,374,322 granted Mar. 19, 1968, and apart from the disclosure herein forms no part of the present invention.

As seen in FIG. 1, the housing 10 has an enlarged annular port area 39 of sufficient diameter that fluid flowing through the enlarged annular port 39 may freely flow around the right piston 30. Adjacent the enlarged annular port 39, the housing is provided with an upper passage or port 41 and a lower passage or port 42 connecting with the enlarged annular port 39 and being provided at their outer ends with suitable fitting receiving portions for connection to the remainder of the brake system as described in greater detail hereinafter.

The enlarged annular port area 39 extends rightwardly from the bore 11 to a counterbore 44. An insert member 45 is received within the counterbore 44 and makes sealing contact therewith by the O-ring seal 46. The seal 46 cooperates with the seal 31 to isolate the enlarged annular port area 39 from the remainder of the axial bore 11. In the preferred embodiment the insert member 45 is a fitting member which further serves to cooperate with the second outlet port to receive a suitable fitting for connection to the remainder of the brake system. An axial passage 47 extends from end to end through the insert member 45 for establishing direct fluid pressure communication between an internally threaded end portion or port 48 and the enlarged annular port area 39 when the passage 47 is opened. A plurality of radial passages 51 extend radially outwardly from the axial passage 47 to an enlarged annular port area 52. In this manner, the radial passages 51 establish fluid pressure communication between the axial passage 47 and a passage 53 which is provided at its outer end with a suitable fitting receiving portion.

A suitable valving member or poppet 54, which is preferably formed of a suitable resilient material such as rubber or synthetic rubber resistant to the action of the fluid used in the system, is provided to maintain the axial passage 47 normally closed. The poppet 54 includes a rounded sealing end portion 55 adapted to be received in sealing contact by an annular valve seat 56 defined by the portion of the insert member 45 surrounding the axial passage 47 at its left end. The poppet 54 is carried by the right piston 30 and is slidably received within an axial bore 58 extending from the right end of the right piston 30. A loose sliding fit is maintained between the poppet 54 and the bore 58 to permit the fluid pressure within the enlarged annular port area 39 to act on the entire end face of the piston 30. A coil spring 59 acts between the right piston 30 and the poppet 54 to maintain the end portion 55 in sealing engagement with the valve seat 56. The springs 22 and 59 are arranged to be equal in biasing action when the intermediate member 24 is in the centered position shown in FIG. 1 so that the ends 25 and 26 are substantially evenly spaced on either side of the stud 33. In this manner, the spring 59 normally provides a biasing action for the right piston 30 to maintain the intermediate member 24 in the centered position as well as providing a biasing action for the poppet 54 so that the axial passage 47 is normally closed when the pressures at the exposed ends of the pistons 20 and 30 are substantially balanced. A snap ring 61 fits in an internal groove 60 at the right end of the piston bore 58 to limit movement of the poppet 54 to the right. Rigid washer members 62 and 63 operate to prevent damage to the poppet 54 by the adjacent metallic surfaces and to prevent excessive wear of the portion of the poppet 54 which engages the bore 58.

Because the valve member or poppet 54 is slidably carried by the right piston 30, slight movement of the pistons 20 and 30 in either direction from the centered position shown in FIG. 1, such as by transient fluid pressure unbalances, will not open the bypass passage 47. Furthermore, the pressure differential between the annular port area 39 and the port 48 will hold the poppet 54 in sealing engagement with the seat 56 even if a resilient means such as spring 59 were not provided. In the event of a fluid pressure unbalance which causes substantial movement of pistons 20 and 30 and the intermediate member 24 to the left, the poppet 54 is moved away from the valve seat 56 a sufficient distance to open the axial passage 47. This establishes direct fluid communication between the enlarged annular port area 39 and the axial passage 47 so that the fluid may freely flow from the passage 41, through the enlarged annular port area 39 and the axial passage 47, directly to the internally threaded portion 48. In the event of a fluid pressure unbalance which causes substantial movement of the pistons 20 and 30 and the intermediate member 24 to the right, the poppet 54 will not interfere with this rightward movement because it is slidably carried on the right piston member 30.

The aforegoing operation of the device is best understood in connection with the schematic diagram shown in FIG. 2. This arrangement shows the device of FIG. 1 in an automotive brake system having a dual or tandem master cylinder 68 which has a front brake line 69 and a rear brake line 70 extending therefrom and connected to separate sources of fluid pressure within the master cylinder 68 in a manner well known in the art. The front outlet line 69 may be connected to any one of the ports 14, 17 or 18, while one or more of the other ports may be connected to one or more front outlet lines 72 leading to the front brakes of the vehicle. Also, as shown in FIG. 2, a wire 74 may be connected from the terminal 37 to an indicator lamp 75 as may be provided on the dashboard of the vehicle, the other side of which lamp is connected by suitable means to a battery 76 which is grounded at 77. Upon electrical connection between the intermediate member 24 and the stud 33, the lamp 75 will light to indicate that a pressure drop has occured in either the front or rear brake line. Also, as shown in FIG. 2, the passage 42 is connected by a suitable line 79 to a proportioning or pressure reducing valve 81. This proportioning valve in turn is connected by a line 82 back to the passage 53, while the passage 48 is connected to a rear brake line 84. In this manner, the invention provides a sensing device having a bypass in which the outlet port to the rear brake cylinders is arranged at one end of the unit. This may simplify the installation of the sensing unit on a motor vehicle, because the rear brake line 84 extends directly to the rear portion of the vehicle where it is connected to a T-fitting for distribution to the two rear brake wheel cylinders. The proportioning valve 81 may be of any construction well known in the art which provides for a pressure reduction across the valve so that the pressure in the rear brake line 84 is, under certain conditions, reduced below the pressure in the rear brake line 70 from the master cylinder 68. It will be understood that proportioning valve 81 and lines 79 and 82 may be built integrally in a single assembly with the housing 10 or may be separate, as is desired, since the particular construction of the proportioning valve forms no part of the present invention.

With this arrangement, since the poppet 54 normally closes off the axial passage 47, while the fluid from the master cylinder to the front brakes flows through the line 69 to the port 17 and from there to one or the other of ports 14 or 18 to the outlet lines 72, the fluid from the rear brake line 70 from the master cylinder has a somewhat different path. The fluid through line 70 enters the enlarged annular port area 39 through the port 41 and from there normally flows outward through the port 42 to the proportioning valve 81. Fluid from the proportioning valve 81 returns through line 82 to port 53 and then flows through radial passages 51 and outlet port 48 to the rear brake line 84. It will be understood that under normal conditions the pressure from the master cylinder is applied to its full extent to both ends of the assembly of the pistons 20 and 30 and intermediate member 24. Since the axial bore 11 is of uniform diameter so that the end portions of the pistons 20 and 30 exposed to fluid pressure are of substantially equal cross-sectional area, the intermediate member 24 never makes contact with the stud 33 when the fluid pressures are substantially equal.

However, upon a loss of pressure in the front brakes, the piston assembly moves toward the left so that the right end 26 of intermediate member 24 moves into electrical contact with the stud 33 to light the lamp 75 in the manner indicated hereinabove. When this occurs, the poppet 54, which is carried by the piston 30, is also moved to the left away from the valve seat 56 at the end of the bypass passage 47. This permits the fluid at full pressure from the master cylinder within the annular port area 39 to flow through the axial bypass passage 47 and from there through the port 48 directly to the rear brakes. Thus, upon loss of pressure in the front brake hydraulic system, the proportioning valve 81 and its attendant function of pressure reduction is bypassed so that full pressure in the rear brake line 70 passes directly to the rear brake line 84 to increase the effective operation of the rear brakes which is necessary to provide maximum effective braking action after failure of the front brakes.

It should be noted that with the arrangement shown herein, should the pressure failure in the front brake system be repaired or eliminated, the action of the springs 22 and 59 causes the assembly of the pistons 20 and 30 to again center itself within the axial bore 11 so that as the piston 30 again moves to the right. The sealing portion 55 of poppet 54 moves into sealing contact with the valve seat 56 to close off the axial bypass passage 47 and again restore the flow of fluid to the rear brakes through the proportioning valve 81 so that the system again operates in the normal manner. It should also be noted that, when the piston 30 is in its normal position shown in FIG. 1, the poppet 54 acts as a return flow check valve to re-establish fluid pressure communication between the brake line 84 and the master cylinder line 70 when the brakes are released after a heavy braking application sufficient to cause the proportioning valve 81 to isolate the line 79 from the line 82. This return flow check valve action occurs when the fluid pressure in the port 41 decreases from a pressure greater than the fluid pressure in the port 48 to a pressure less than the fluid pressure in the port 48, and eliminates the need for providing such a return flow check valve in the proportioning valve 81.

We claim:

1. In a dual hydraulic system having first and second lines normally subject to substantially equal pressures, a sensing unit including a housing connected to said first and second lines to produce a signal responsive to a predetermined pressure differential between said lines, a pressure changing device in one of said lines, and said sensing unit including valve means operable responsive to said pressure differential to render said pressure changing device inoperable in said one line, the improvement comprising said valve means including a piston member axially movable in said housing responsive to said predetermined pressure differential and having a neutral position when said pressures are balanced, an insert member in said housing axially spaced from said piston member, an axially extending passage in said insert member, said insert member including an annular end face surrounding said passage, valve seat means carried by said piston member for engaging said annular end face for closing said axially extending passage when said piston member is in said neutral position and for moving away from said annular end face for opening said axially extending passage when said piston member is moved from said neutral position by said predetermined pressure differential, said opening of said passage by said movement of said valve seat means rendering said pressure changing device inoperable, resilient means for resiliently urging said valve seat means in a direction toward said annular end face, and said valve seat means being a poppet slidably disposed on said piston member and operatively connected to said resilient means for movement away from said annular end face against the urging of said resilient means when said piston member is in said neutral position.

2. A sensing unit as set forth in claim 1, wherein said piston member is slidably disposed within a bore in said housing, and said passage is in axially aligned relationship with said piston member.

3. A sensing unit as set forth in claim 2, wherein said insert member is fixedly disposed in said bore.

4. A combination hydraulic brake warning device for use in a dual brake system including a housing, an axial bore in said housing, piston means slidably mounted in said axial bore and making sealing engagement with the walls thereof, signal sensing means operable by movement of said piston means in said bore in either direction from a centered position, passage means at one end of said axial bore to admit fluid pressure to one end of said piston means from a first brake line, a first chamber at the other end of said piston means, an inlet to said first chamber connected to a second brake line whereby said piston means is normally held in a centered position by a balanced fluid pressure at said passage means and said first chamber, said first chamber having an outlet passage, a pressure changing valve having an inlet and an outlet, said valve inlet being connected to said first chamber outlet passage, a second chamber at the other end of said axial bore, an inlet port in said housing connecting said valve outlet to said second chamber, a bypass passage extending between said first chamber and said second chamber, an annular end face surrounding said bypass passage, a valve member operable to engage said annular end face to close said bypass passage, said valve member being slidably carried by said piston means so that said valve member engages said annular end face and continuously closes said bypass passage when said piston means is in said centered position and when said piston means is moved only a slight distance in either direction in said bore from said centered position, said valve member being moved away from said annular end face to open said bypass passage and establish direct fluid pressure communication between said first chamber and said second chamber when said piston means is moved a substantial distance in said bore in one direction from said centered position, and said valve member being resiliently urged in a direction toward said annular end face and being movable away from said annular end face to operate as a one-way check valve when said piston means is in said centered position to establish direct fluid communication from said second chamber to said first chamber through said bypass passage when the fluid pressure in said second chamber exceeds the fluid pressure in said first chamber.

5. A sensing unit as set forth in claim 4, wherein said valve member is slidably disposed in a bore in said piston means, and a spring means acts between said piston means and said valve member to resiliently urge said valve member toward said bypass passage.

6. A sensing unit as set forth in claim 5, wherein said bypass passage is formed in an insert member disposed in said bore in axially aligned relationship with said piston means, said valve member is a poppet member, and said poppet member cooperates with said annular end face to close said bypass passage when said piston means is in said centered position.

7. A sensing unit as set forth in claim 6 including an outlet port in said housing connected to said second chamber and in axially aligned relationship with said axial bore, and said insert member includes a fitting portion cooperating with said outlet port to receive a suitable fitting for connection to the remainder of the brake system.

8. In a dual hydraulic system having first and second lines normally subject to substantially equal pressures, a sensing unit including a housing connected to said first and second lines to produce a signal responsive to a predetermined pressure differential between said lines, a pressure changing device in one of said lines, said pressure changing device having an inlet side and an outlet side, said pressure changing device including means for maintaining said outlet side pressure less than said inlet side pressure when said inlet side pressure increases above a predetermined pressure, and said sensing unit including valve means operable responsive to said pressure differential to render said pressure changing device inoperable in said one line, the improvement comprising said valve means including a piston member axially movable in said housing responsive to said predetermined pressure differential and having a neutral position when said pressures are balanced, an insert member in said housing axially spaced from said piston member, an axially extending passage in said insert member, an annular end face surrounding one end of said passage, valve seat means for engaging said annular end face for closing said passage when said piston member is in said neutral position and for moving away from said annular end face for opening said axially extending passage when said piston member is moved from said neutral position by said predetermined pressure differential, said valve seat means being a poppet, and resilient means urging said poppet toward said annular end face, said resilient means being operatively connected to said poppet to permit said poppet to be displaced against the biasing force of said resilient means away from said annular end face to open said passage without substantial movement of said piston member from said neutral position when said inlet side pressure decreases to a pressure below said outlet side pressure.

9. A sensing unit as defined in claim 8 wherein said poppet is carried on said piston member, and said passage extends axially in axially aligned relationship with said poppet.

10. A sensing unit as defined in claim 9 wherein said piston member is slidably disposed within a bore in said housing, and said insert member is fixedly disposed in said bore.

* * * * *